(12) United States Patent
Van Der Vleuten et al.

(10) Patent No.: US 9,510,005 B2
(45) Date of Patent: Nov. 29, 2016

(54) METHOD AND DEVICE FOR ENCODING BLOCKS OF VALUES

(75) Inventors: Renatus Josephus Van Der Vleuten, Eindhoven (NL); Lambertus Antonius Van Eggelen, Eindhoven (NL); Ihor Kirenko, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 2192 days.

(21) Appl. No.: 11/568,724

(22) PCT Filed: Apr. 28, 2005

(86) PCT No.: PCT/IB2005/051393
§ 371 (c)(1),
(2), (4) Date: Nov. 6, 2006

(87) PCT Pub. No.: WO2005/112467
PCT Pub. Date: Nov. 24, 2005

(65) Prior Publication Data
US 2007/0165713 A1    Jul. 19, 2007

(30) Foreign Application Priority Data
May 13, 2004 (EP) .................................. 04300275

(51) Int. Cl.
*H04N 19/34* (2014.01)
*H04N 19/136* (2014.01)
*H04N 19/18* (2014.01)
*H04N 19/184* (2014.01)
*H04N 19/60* (2014.01)

(52) U.S. Cl.
CPC ............ *H04N 19/34* (2014.11); *H04N 19/136* (2014.11); *H04N 19/18* (2014.11); *H04N 19/184* (2014.11); *H04N 19/60* (2014.11)

(58) Field of Classification Search
CPC ....................................................... H04N 19/34
See application file for complete search history.

(56) References Cited

U.S. PATENT DOCUMENTS

| 5,278,646 A | 1/1994 | Civanlar et al. |
| 6,351,568 B1 | 2/2002 | Andrew |
| 6,556,719 B1 | 4/2003 | Monro |

FOREIGN PATENT DOCUMENTS

| WO | 9837700 | 8/1998 |
| WO | 0117268 A1 | 3/2001 |

OTHER PUBLICATIONS

Fan Ling et al; "Bitplane Coding of DCT Coefficients for Image and Video Compression", Proceedings of the SPIE, Bellingham, VA, vol. 3653, No. 1-2, 1998, pp. 500-508, XP000892979.

*Primary Examiner* — Mikhail Itskovich

(57) ABSTRACT

The present invention relates to a method of encoding blocks of values, e.g. DCT blocks, generated in accordance with an image compression scheme. The values are expressed as a set of bit planes, each bit plane comprising, for the values, all bits with a specific significance. In each bit plane at least one parameter is determined (7) in accordance with a predetermined definition, the parameter defining a partition of the bits in the bit plane which encloses all set bits. All bits in the partition are transferred (8) to a bit stream that may be truncated. This provides a method with low complexity. The invention further relates to a corresponding encoding device, a corresponding decoding device, and a corresponding bitstream.

8 Claims, 7 Drawing Sheets

FIG.7a

Magnitude

| 0 | 1 |
|---|---|
| 1 | 0 |

Sign

|   | − |
|---|---|
| + | + |

$R_{MAX} = 1$
$C_{MAX} = 1$

FIG.7b

Magnitude

| 1 | 0 | 1 |
|---|---|---|
| 1 | 1 | 0 |

Sign

|   |   | + |
|---|---|---|
|   |   | − |

$R_{MAX} = 1$
$C_{MAX} = 2$

FIG.7c

Magnitude

| 0 | 1 |
|---|---|
| 1 | 0 |
| 1 | 1 |

Sign

|   |   |
|---|---|
|   |   |
| + | + |

$R_{MAX} = 2$
$C_{MAX} = 1$

METHOD AND DEVICE FOR ENCODING BLOCKS OF VALUES

FIELD OF THE INVENTION

The present invention relates to a method of encoding a signal, comprising blocks of values, in order to obtain a bit-stream, the method comprising the steps of: representing each block as a sequence of bit planes, wherein the most significant bits of said values form a most significant bit plane, and the respective less significant bits of said values form respective less significant bit planes; and extracting information from said bit planes. The invention further relates to a corresponding encoding device, a corresponding decoding device and a corresponding bit-stream.

BACKGROUND OF THE INVENTION

Such a method is described e.g. in WO, 01/17268, A1. In this method, for each bit plane, the significant bits, i.e. bits for values, which have had set bits in more significant bit planes are sent first. Then a scan zone is checked for newly significant bits, i.e. set bits outside the group of significant bits, and these bits are included in the bit stream. This provides a reliable and efficient encoding of information blocks, when used for compression of image data. A drawback with this method is that its realisation is quite complex.

SUMMARY OF THE INVENTION

It is an object of the present invention to provide a less complex coding scheme.

This object is achieved by means of a method of encoding a signal, a corresponding encoding device, a corresponding decoding device, and a corresponding bit-stream.

More specifically, the invention relates to a method of encoding a signal, comprising blocks of values, in order to obtain a bit-stream, the method comprising the steps of: representing a block as a sequence of bit planes, wherein the most significant bits of said values form a most significant bit plane, and the respective less significant bits of said values form respective less significant bit planes; and extracting information from said bit planes, wherein for a bit plane at least one parameter is determined, in accordance with a predetermined parameter definition, in such a way that said at least one parameter defines a partition of the bits in the bit plane, the partition including all set bits, the parameter is transmitted to the bit-stream, and all bits in said partition of bits are scanned and transmitted to said bit-stream.

This provides an encoding method with lower complexity, since the number of bits that must be read only depends on the number of bits that are set in a bit plane, not on whether individual bits in the partition are significant or not. This allows a faster, less complex, parallel implementation.

In a preferred embodiment, for a bit plane, if a value for the first time corresponds to a bit in the partition, a sign bit corresponding to this value is transmitted to said bit-stream. This provides an efficient scheme for including the sign bits in the bit stream.

In a preferred embodiment, the bit plane comprises rows and columns and the at least one parameter comprises a first parameter, which is the number of the row, most distant from a predetermined corner of said bit plane, which comprises a set bit and a second parameter, which is the number of the column, most distant from said corner, which comprises a set bit. In an alternative embodiment, the at least one parameter comprises a parameter, which is a highest bit order number in a bit order sequence, comprising a plurality of bits in said bit plane, which bit order number comprises a set bit. Both these embodiments provide efficient partition definitions.

Preferably, said partition forms a continuous zone in said bit plane.

In an embodiment of the invention, the bits corresponding to at least one value are sent separately in a sequence. This may be used e.g. for a DC value in a DCT block, which value is most important.

Preferably, the bit planes of a block are processed in an order of decreasing bit plane significance. This provides a substantially improved compression efficiency.

The signal may preferably comprise transform coefficients.

According to a second aspect, the invention relates to an encoding device corresponding to the above method and providing corresponding advantages. In general the encoding device comprises means for performing the steps of the above method.

According to a third aspect, the invention relates to a device for decoding a bit stream, accomplished according to the above method, and providing corresponding advantages. The decoding device comprises means for receiving from the bit-stream the at least one parameter, means for receiving all bits in the partition of bits, and means for reconstructing the values on the basis of said at least one parameter and said received bits.

According to a fourth aspect, the invention relates to a bit-stream, accomplished in accordance with the above method. The bit stream then comprises the at least one parameter and all bits in said partition of bits.

These and other aspects of the invention will be apparent from and elucidated with reference to the embodiments described hereinafter.

BRIEF DESCRIPTION OF THE DRAWINGS

The present invention will now be described in more detail, by way of example, with reference to the accompanying drawings, wherein:

FIGS. 7*a*-7*c* illustrate an example of three bit-planes in a sequence and the corresponding generated information.

DETAILED DESCRIPTION OF THE INVENTION

The present invention relates generally to a method of coding a signal, comprising blocks of values, in order to obtain a scalable bit-stream.

A typical application of such a method is still image or video compression coding. In most still image coding schemes an image is divided into a plurality of blocks, e.g. rectangular blocks with 8×8 pixels. On such a block, a Discrete Cosine Transform (DCT) can be carried out.

Figure 1:
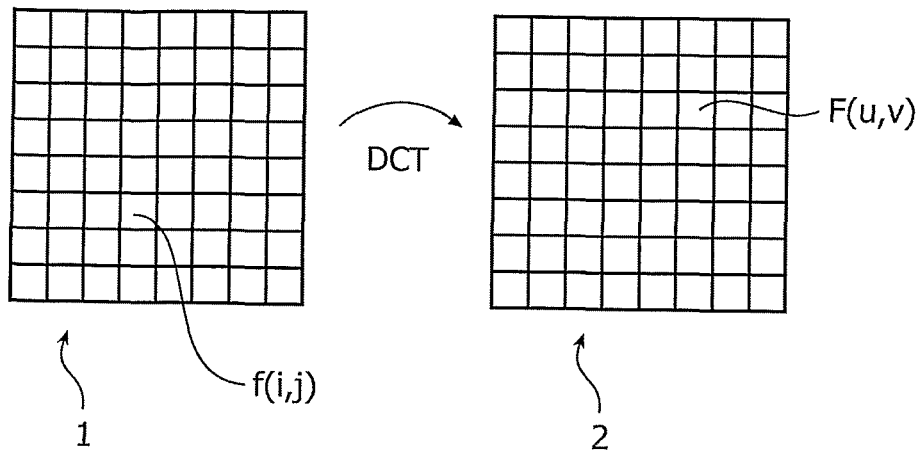
FIG. 1 illustrates schematically a data structure before and after a Discrete Cosine Transform (DCT) has been carried out.

FIG. 1 illustrates structures before and after a DCT has been carried out. An image block 1 comprises a matrix with 8×8 pixels, each pixel having an intensity value f(i,j). By application of the well known DCT a frequency domain block 2, comprising matrix with 8×8 coefficients F(u,v) in the range e.g. from −1023 to 1023, is obtained. The definition of the DCT is usually such that the top left coefficient F(0,0) comprises the DC component in the image block 1. With increasing row numbers, the coefficient relate to functions with increasing frequencies in the vertical direction in the image block 1. With increasing column numbers, the coefficient relate to functions with increasing frequencies in the horizontal direction in the image block 1.

The frequency domain block 2 contains all information needed to reconstruct the image block 1, which can be done using an Inverse DCT (IDCT). Most of the image energy of a typical image is however concentrated to the area around the DC coefficient. An encoding scheme can therefore be applied, that generates a bit-stream from the frequency domain block, where the most important information is sent first, followed by information with decreasing importance.

This bit-stream is scalable in the sense that it may be truncated at any position. The later the bit-stream is truncated, the smaller the residual error when the image is reconstructed. The bits transmitted to the bit stream may before or after truncation be stored in a memory and/or sent over a channel.

Figure 2:
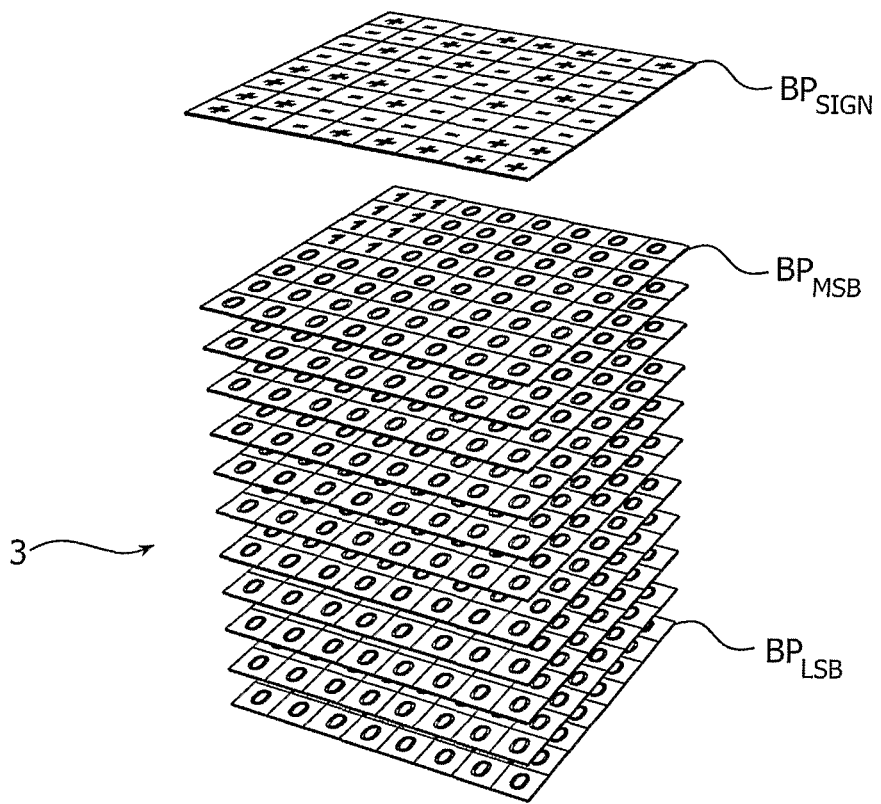
FIG. 2 illustrates a bit layer structure.

The present invention relates to a method of generating a bit-stream from an information block. In order to extract information from an information block a bit layer structure is employed. FIG. 2 illustrates a bit layer structure 3. The bit layer structure 3 comprises a sign plane $BP_{SIGN}$ and eleven bit planes from the most significant bit plane $BP_{MSB}$ to the least significant bit plane $BP_{LSB}$. If the coefficients F(u,v) in the frequency domain block 2 in FIG. 1 can range from −2047 to 2047, then each such coefficient may be represented by a bit in a corresponding position (u,v) in the sign plane $BP_{SIGN}$ and bits in the corresponding position (u,v) in each of the bit planes $BP_{MSB}$ to $BP_{LSB}$. E.g. if the coefficient in the fourth row and the fourth column F(3,3)=−36, then the corresponding sign and bit plane values will be the following:

| Layer | Value |
|---|---|
| $BP_{SIGN}$ | — |
| $BP_{MSB}$ = 1 | 0(*1024) |
| 2 | 0(*512) |
| 3 | 0(*256) |
| 4 | 0(*128) |
| 5 | 0(*64) |
| 6 | 1(*32) |
| 7 | 0(*16) |
| 8 | 0(*8) |
| 9 | 1(*4) |
| 10 | 0(*2) |
| $BP_{LSB}$ = 11 | 0(*1) |

It should be noted that a given layer is capable of containing more energy than all layers with lower significance together. Therefore, in order to extract the most important information first, each information block should be processed bit-plane by bit-plane, starting with the most important bit-plane $BP_{MSB}$. An exception from this rule is that the DC coefficient, which is normally most important, can be sent in its entirety first. This exception may in principle apply also for other values.

Figure 3:
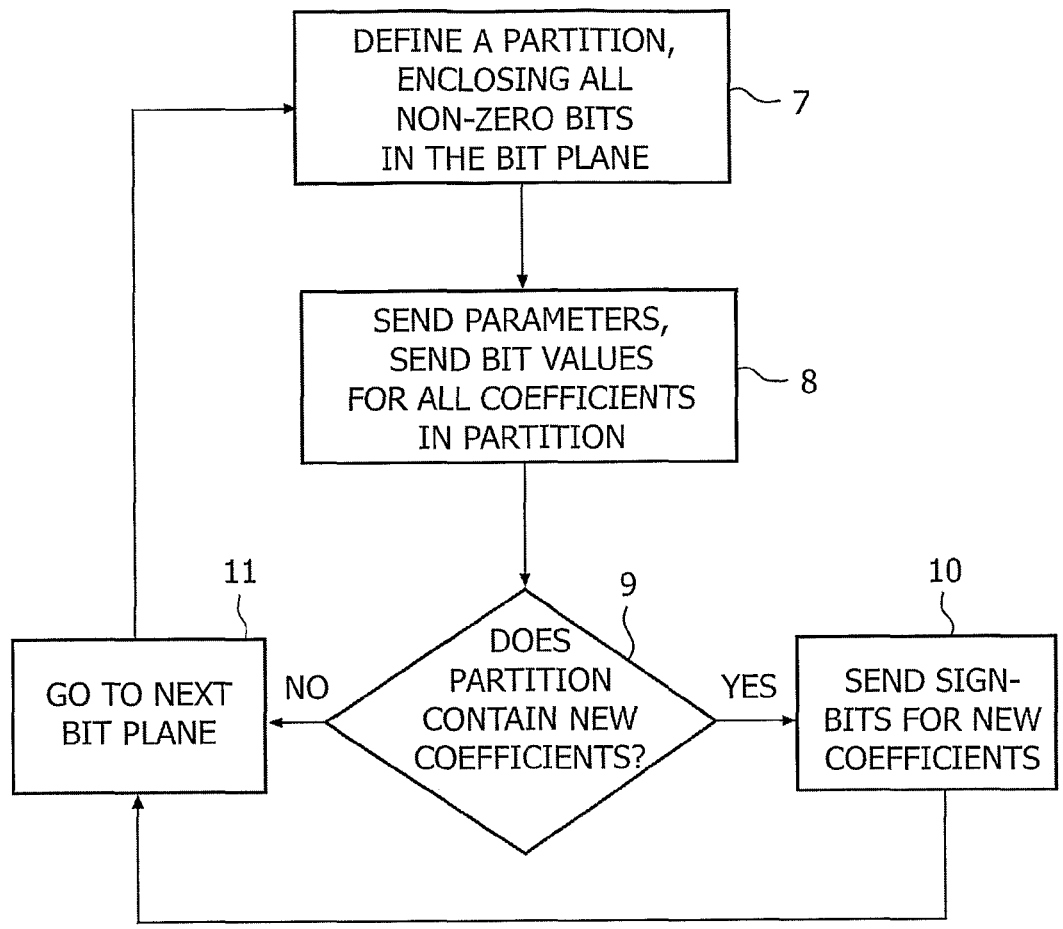
FIG. 3 illustrates a flow chart of a method according to an embodiment of the invention.

FIG. 3 illustrates a flow chart of a method according to an embodiment of the invention. In the embodiment, the method comprises the following steps. For each bit plane a parameter corresponding to a partition is defined 7, the partition enclosing all set bits in the bit-plane, as will be explained further below. Then, the parameter and the bit values for all coefficients in the partition are sent 8. It is checked 9 whether there are any "new" coefficients in this partition, i.e. coefficients/positions that have not been dealt with earlier in connection with a preceding bit plane (for each $BP_{MSB}$ obviously all coefficients are new). If so, the sign bits for the new coefficients are sent 10. Thereafter the method proceeds 11 to the next bit-plane, until all bit-planes have been processed. It should be understood that the sign bits could be processed separately. In that case the method proceeds from step 8 directly to step 11.

Defining a partition, enclosing all set bits can preferably be carried out by forming a rectangular zone or by forming a one-dimensional partition. By a set bit is normally meant a one. Of course, the meaning of one and zero could in principle be reversed as compared to the definition normally used, i.e. one meaning false and zero meaning true. In that case a set bit of course means a zero.

Figures 4, 5:
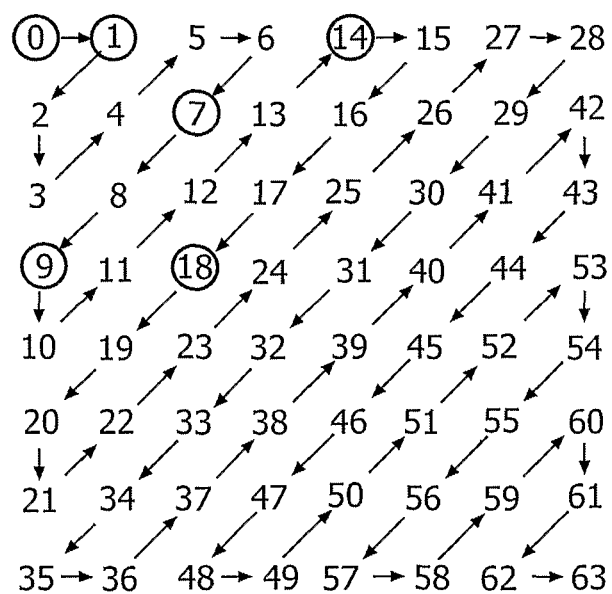
FIG. 4 illustrates a rectangular zone in a bit plane.
FIG. 5 illustrates a one-dimensional partition in a bit plane.

FIG. 4 illustrates a rectangular zone in a bit plane, as described in WO, 01/17268, A1. The zone defines a partition of bits in a bit plane. In this case, the zone is defined by the following parameters: the highest row number, $R_{MAX}$, comprising any set bits (ones) and the highest column number, $C_{MAX}$, comprising any set bits. Thus the partition is rectangular and defined as ($R_{MAX}$=3; $C_{MAX}$=4). The zone comprises 20 bits, six of which are set.

FIG. 5 illustrates a one-dimensional partition in a bit plane. The positions in the plane are given a specific order from the most important (0) (upper left) to the least important (63) (lower right). The one dimensional partition definition thus follows a predetermined zigzag shaped path over the bit-plane including all positions. In this case the partition is defined by a parameter, comprising the highest order number having a set bit. With the order illustrated in FIG. 5 a bit-plane as illustrated in FIG. 4 (set bits encircled) has a zone defined by the order number $S_{MAX}$=18. The zone thus comprises 19 positions (including the DC position), six of which are set. It should be noted that the illustrated position order, although preferred, is only an example. Other position orders are feasible. Even if the partition in this case is defined as a continuous zone, it is also possible to use a discontinuous partition.

In prior art coding schemes, positions, for which preceding (higher ranked) bit-planes in a block have contained ones are denoted as "significant" positions. The significant positions together form a "mask". In the prior art these positions are treated separately. First bit values for each significant position in the bit plane are sent. Then the bit-plane is searched for ones outside the mask, so-called "newly significant" positions. Sign bits for these positions are sent, and they are included in the mask.

As a contrast, in accordance with an embodiment of the present invention, there is made no difference between "significant" and "insignificant" bits in a bit-plane. Instead, a partition is defined, including all ones, and all magnitude bits within this partition, which may be a continuous zone, are sent to the bit-stream, regardless of whether they are significant or not. Sign bit data is sent for a coefficient as soon as it is included in a partition for the first time.

This scheme may be implemented with less complexity, and a faster parallel implementation may be achieved. This is due to the fact that the number of bits that must be read in a bit-plane now depends only on the size of the partition/zone, not on the properties of the individual coefficients within the zone. The bits may be encoded (or later decoded) in a single pass over the zone.

It could be expected that this scheme would cause a somewhat reduced compression efficiency, since, in some cases, data will be sent for a coefficient that is zero in all planes. Rather surprisingly, it has however been shown that in many cases the efficiency is instead increased, as will be shown later on.

Figure 6:
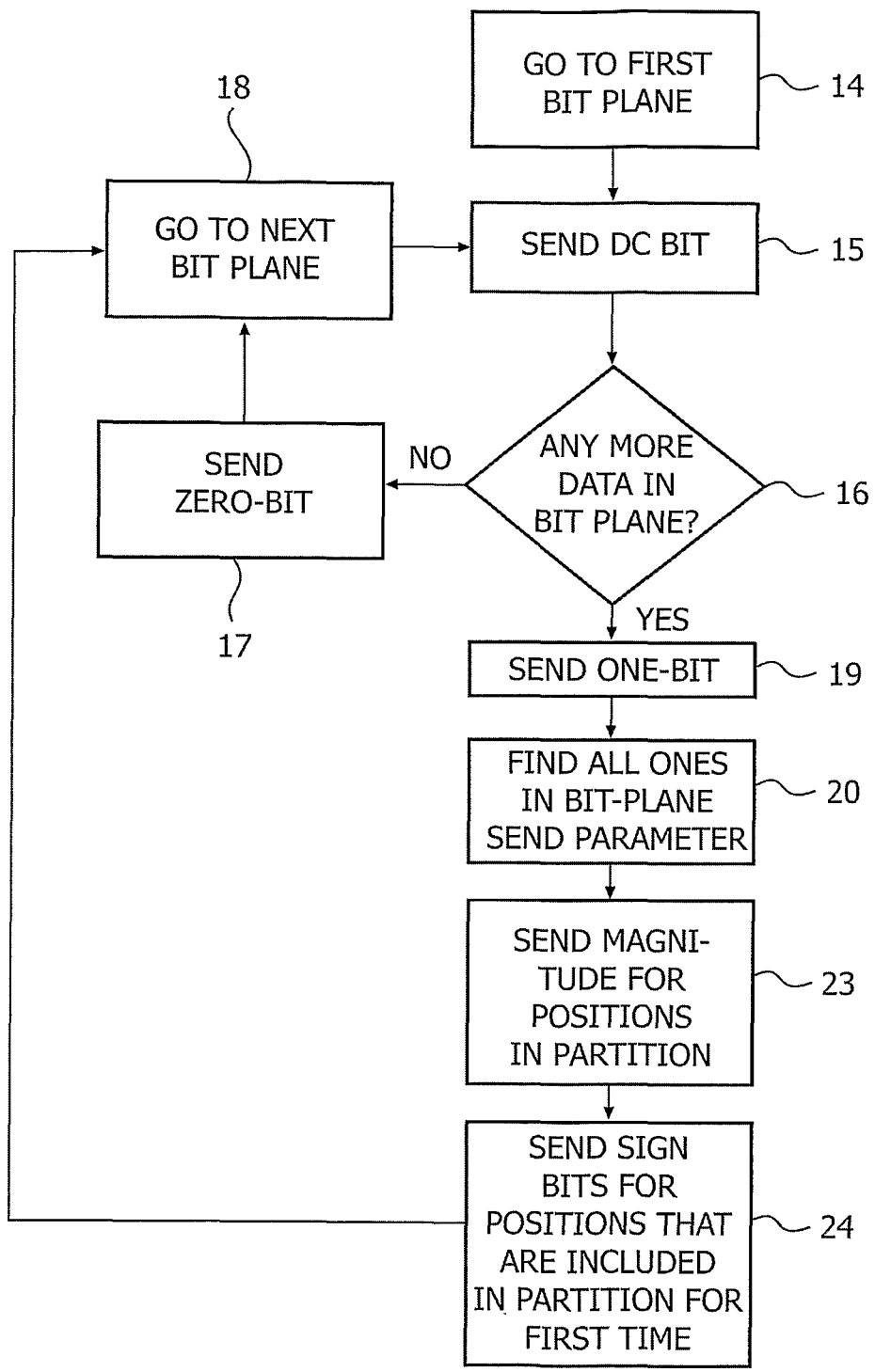
FIG. 6 illustrates, more detailed, a flow chart of a method according to an embodiment of the invention.

FIG. 6 illustrates, more detailed, a flow chart of a method according to an embodiment of the invention. The scheme starts by turning 14 to the most significant bit plane. In this bit plane, the DC bit is sent 15 to the bit stream. Then, it is checked 16 whether there are any more ones in the bit plane, i.e. AC data. If not, a zero bit is sent 17 to the bit stream, and the scheme turns 18 to the next bit-plane in order of decreasing significance.

If there are more data, a one is instead sent 19, all ones are found in the bit plane, and a definition (parameter) of a partition, including all ones, is sent 20. Then, magnitude bits for all positions in the defined partition are sent 23. If a linear partition ($S_{MAX}$) is used, the last bit in the partition, which is $S_{MAX}$, is always a one, and need not be sent again.

Subsequently, sign bits for all positions, that are in the partition and whose sign bits have not been sent already, are sent 24 (in the most significant bit plane sign bits for all positions in the zone are sent). Then, the method turns 18 to the next bit plane. This cycle is repeated until all bit-planes in a block has been processed.

FIGS. 7a-7c illustrate an example of three bit-planes in a sequence and the corresponding generated information in accordance with an embodiment of the invention. A partition in the form of a rectangular scan zone is used. In FIG. 7a, which illustrates the most significant bit plane, positions (row, column) (0,1) and (1,0) are set. $R_{MAX}$ and $C_{MAX}$ are thus both 1. Magnitudes of all four positions in the zone are sent, as well as the corresponding signs. The sign of the DC value is always positive and need not be sent. In FIG. 7b, which illustrates the bit plane following the most significant bit plane, positions (row, column) (0,0), (0,2), (1,0) and (1,1) are set. $R_{MAX}$ is 1 and $C_{MAX}$ is 2. Magnitudes of all six positions in the zone are sent. Signs for (0,2) and (1,2), which are in the zone and which have not previously been sent, are sent now. In FIG. 7c, which illustrates the bit plane following the bit plane in FIG. 7b, positions (row, column) (0,1), (1,0), (2,0) and (2,1) are set. $R_{MAX}$ is 2 and $C_{MAX}$ is 1. Magnitudes of all six positions in the zone are sent. Signs for (2,0) and (2,1), which are in the zone and which have not previously been sent, are sent now. Since signs are sent for values that are included in a partition, a decoder, decoding the bit stream, may estimate the amount of this value, even if this value has no set bits in the encoded bit stream, which may be truncated at an early stage. This is done by estimating that such a value would have a one in a later bit-plane, as will be described further. This has proven to improve the compression efficiency.

Figure 8A:
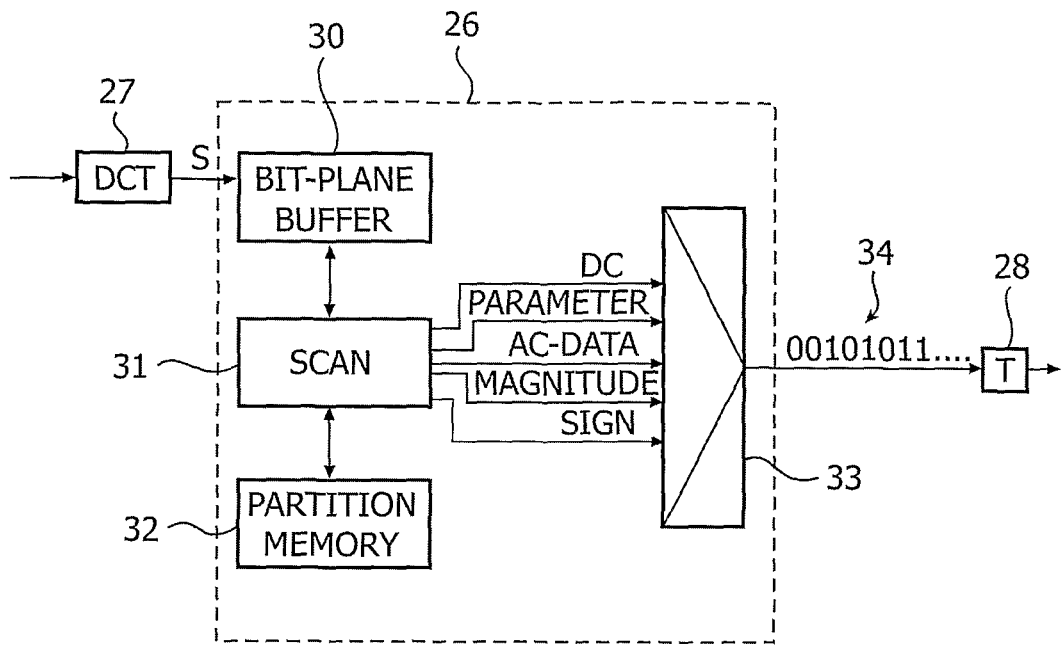
FIG. 8*a* illustrates a device for generating a scalable bit stream from a signal S comprising blocks of data.

FIG. 8a illustrates a coding device 26 for generating a scalable bit stream from a signal S comprising blocks of data. The device may typically be included in an encoder, following a DCT unit 27, generating a block signal S. The signal S may comprise the "raw" DCT blocks or DCT blocks that have been post-processed in some way, e.g. by application so-called perceptual weighting, where values in a block may be changed. The coding device 26 may be followed by a truncating device 28, truncating the scalable bit stream at different positions in order to obtain different desired bitrates.

The coding device 26 comprises a bit-plane buffer 30, temporarily storing incoming blocks in a manner suitable for bit-plane-wise reading. The coding device 26 further comprises a scanner 31, connected to a partition memory 32. The scanner 31 scans the block stored in the bit-plane buffer 30 and generates for each bit-plane the following outputs to a multiplexer 33, which multiplexes incoming information into a scalable bit stream in accordance with a predetermined pattern:

A DC signal comprising the magnitude for the DC component in the bit-plane.

An AC-DATA signal which is one if any of the AC positions in the bit-plane is set.

A parameter signal, defining a partition or zone, comprising all set bits in the bit-plane, either as a rectangular zone or as a one-dimensional partition.

A magnitude signal comprising the magnitudes in the bit-plane for all positions in the partition.

A sign signal comprising the signs for all positions in the partition, for which positions a sign bit has not already been sent. This is checked by the scanner 31, by consulting, as a lookup table, the partition memory 32, comprising all positions for which sign bits have already been sent in this block.

Figure 8B:
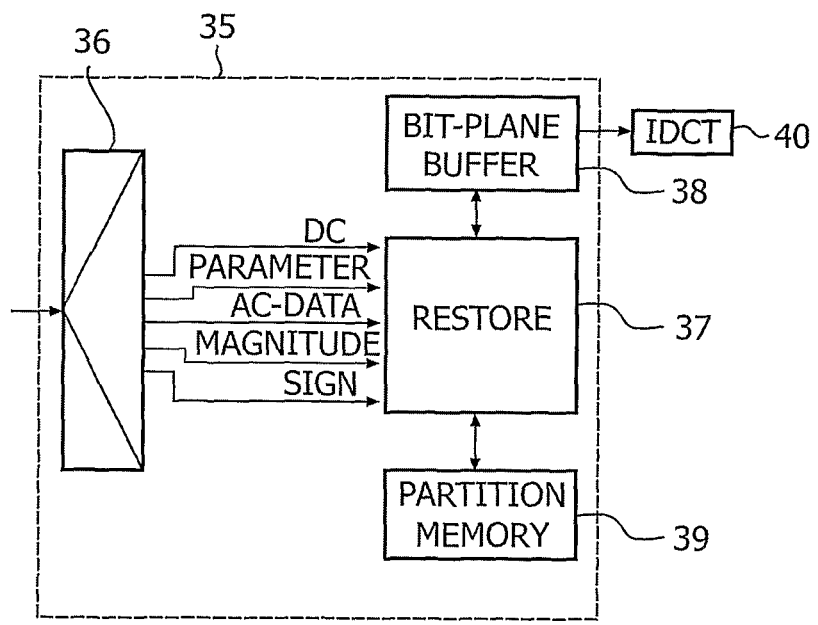
FIG. 8*b* illustrates a corresponding decoding device.

FIG. 8b illustrates a decoding device 35, essentially comprising a mirror image of the encoding device 26 in FIG. 8a. A demultiplexer 36 receives a bit-stream and splits the same into a number of signals corresponding to those in FIG. 8a. A restoring unit 37 receives these signals and writes information into a bit plane buffer 38, using a partition memory 39, containing information regarding for which values in a block sign bits have been received. If the received bit-stream has been truncated, the bit-planes of the corresponding block will not be filled with ones and zeroes when the bit stream ends. Then the restoring unit 37 estimates magnitudes for the empty positions.

For values having received sign bits (i.e. the bits relating to values which have been included in a partition), remaining bits are preferably estimated to have such magnitudes that their values are estimated to be about ¼ from the bottom their respective uncertainty interval. For example, the value +1010xxx (x denoting a missing bit) is estimated to be +1010010. Of course other estimation schemes are possible. For values not having received sign bits (i.e. the bits relating to values which have not been included in any partition) the remaining bits are estimated to be zeroes. The information block may thus be completed and sent to an inverse transform unit 40 where image information may be restored.

The functional blocks of the encoder and decoder devices may of course be realised in several ways, using software and/or hardware, such as application specific integrated circuits (ASICs).

Figure 9:
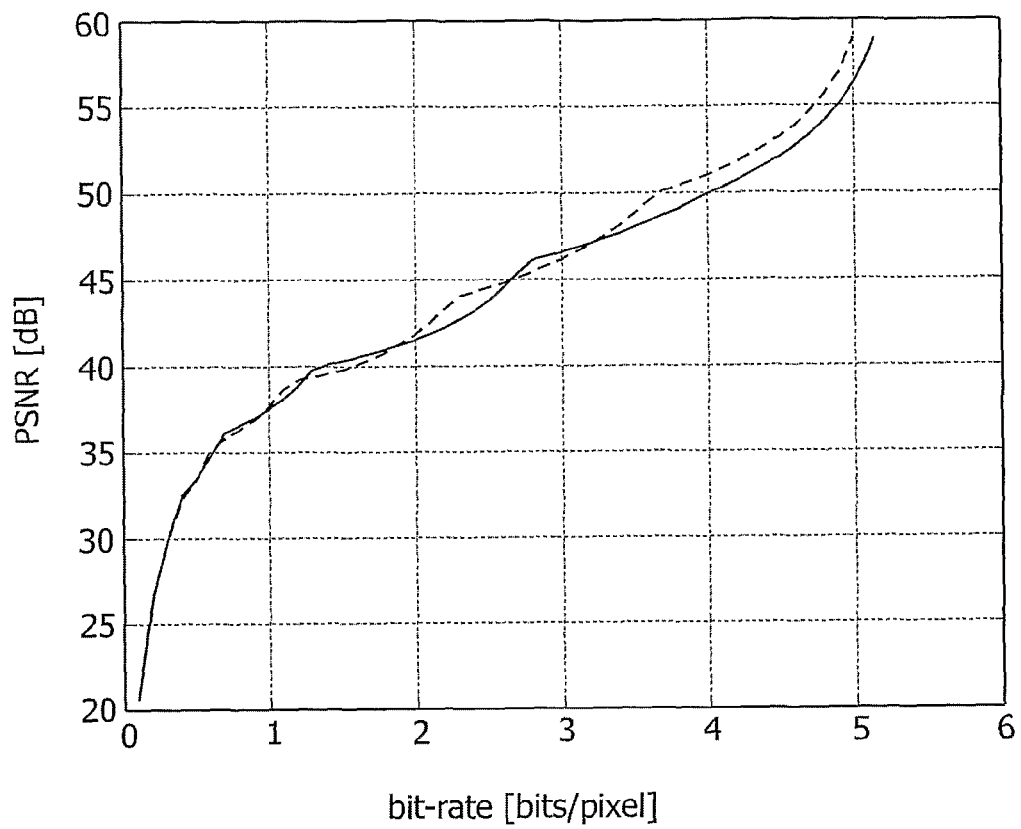
FIG. 9 shows a diagram illustrating a comparison between a prior art coding method and a method according to an embodiment of the invention.

FIG. 9 shows a diagram illustrating a comparison between a prior art coding method (broken line), corresponding to the method described in WO, 01/17268, A1, and a method (continuous line) according to an embodiment of the invention. The well known "Lena" image has been encoded and compressed using the two methods. The error between the restored image and the original image has been measured. The method in accordance with an embodiment of the invention in many cases generates more bits for each plane, and therefore a lower compression efficiency can be expected, compared to the more complex prior art method. As can be seen in FIG. 9, this is true for high bit rates (low compression). Quite surprisingly, however, for lower bit rates the methods are equally effective and in some cases the inventive method is even more efficient than the prior art method, due to the above mentioned possibility to estimate the values with no set bits. The error for the "Lena" image becomes invisible at 40 dB PSNR. Therefore the method according to the invention is preferred over the prior art method for most applications.

In summary, the invention relates to a method of encoding blocks of values, e.g. DCT blocks, generated in accordance with an image compression scheme. The values are expressed as a set of bit planes, each bit plane comprising, for the values, all bits with a specific significance. In each bit plane at least one parameter is determined in accordance with a predetermined definition, the parameter defining a partition of the bits in the bit plane which encloses all set bits. All bits in the partition are transferred to a bit stream that may be truncated. This provides a method with low complexity. The invention further relates to a corresponding encoding device, a corresponding decoding device, and a corresponding bit-stream.

The invention is not restricted to the described embodiments. It can be altered in different ways within the scope of the appended claims.

Any reference sign in a claim should not be construed as limiting the claim. Use of the verb "to comprise" and its conjugations does not exclude the presence of elements or steps other than those stated in a claim. Use of the article "a" or "an" preceding an element or step does not exclude the presence of a plurality of such elements or steps.

The invention claimed is:

1. A method of encoding a signal that comprises blocks of values that are generated in accordance with a compression scheme in order to obtain a bit-stream, the method comprising the steps of:
    representing a block as a sequence of bit planes, wherein the most significant bits of said values form a most significant bit plane, and the respective less significant bits of said values form respective less significant bit planes; and
    extracting information from said bit planes by processing said bit planes bit-plane by bit-plane, starting with the most significant bit plane, wherein for each bit plane:
    (i) a parameter ($S_{MAX}$) of a corresponding bit plane is determined, in accordance with a predetermined parameter definition, in such a way that said parameter $S_{MAX}$ defines a one-dimensional partition of significant and insignificant bits of the corresponding bit plane, the defined one-dimensional partition enclosing all set bits of the corresponding bit plane, wherein the one-dimensional partition of significant and insignificant bits follows a predetermined shaped path over the corresponding bit plane, the predetermined shaped path including all positions in a bit order sequence from a lowest order number position to a highest order number position of the corresponding bit plane, wherein the parameter $S_{MAX}$ comprises an order number corresponding to a highest bit order number set bit in the bit order sequence of the one-dimensional partition, wherein a set bit is meant as one selected from the group consisting of a one and a zero,
    (ii) the parameter ($S_{MAX}$) of the corresponding bit plane is transmitted to said bit-stream, and
    (iii) all magnitude bits, which includes all set bits and which can also include non-set bits, whether significant bits or insignificant bits, enclosed within said partition of bits defined by said parameter ($S_{MAX}$) of the corresponding bit plane are scanned and transmitted to said bit-stream.

2. The method according to claim 1, wherein for the given bit plane, if a value for the first time corresponds to a bit in the partition, a sign bit corresponding to this value is also scanned and transmitted to said bit-stream.

3. The method according to claim 1, wherein said partition forms a continuous zone in said given bit plane.

4. The method according to claim 1, wherein bits corresponding to at least one value are sent separately in a sequence.

5. The method according to claim 1, wherein the bit planes of a block are processed in an order of decreasing bit plane significance.

6. The method according to claim 1, wherein said signal comprises transform coefficients.

7. A device for encoding a signal that comprises blocks of values that are generated in accordance with a compression scheme in order to obtain a bit-stream, the device comprising:
    a bit-plane buffer for representing a block as a sequence of bit planes, wherein the most significant bits of said values form a most significant bit plane, and the respective less significant bits of said values form respective less significant bit planes; and
    a scanner and partition memory for extracting information from said bit planes by processing said bit planes bit-plane by bit-plane, starting with the most significant bit plane, wherein the scanner and partition memory are configured for
    (i) determining, for each bit plane, a parameter ($S_{MAX}$) of a corresponding bit plane in accordance with a predetermined parameter definition, in such a way that said parameter $S_{MAX}$ defines a one-dimensional partition of significant and insignificant bits of the corresponding bit plane, the defined one-dimensional partition enclosing all set bits in the corresponding bit plane, wherein the one-dimensional partition of significant and insignificant bits follows a predetermined shaped path over the corresponding bit plane, the predetermined shaped path including all positions in a bit order sequence from a lowest order number position to a highest order number position of the corresponding bit plane, wherein the parameter $S_{MAX}$ comprises an order number corresponding to a highest bit order number set bit in the bit order sequence of the one-dimensional partition, wherein a set bit is meant as one selected from the group consisting of a one and a zero,
    (ii) transmitting the parameter ($S_{MAX}$) to said bit-stream, and
    (iii) scanning and transmitting all magnitude bits, which includes all set bits and which can also include non-set bits, whether significant bits or insignificant bits, enclosed within said partition of bits defined by said parameter ($S_{MAX}$) of the corresponding bit plane to said bit-stream.

8. A device for decoding a bit-stream, corresponding to blocks of values, wherein each block is represented as a sequence of bit planes, the most significant bits of said values forming a most significant bit plane, and the respective less significant bits of said values forming respective less significant bit planes, and wherein the bit stream comprises information extracted from said bit planes by processing said bit planes bit-plane by bit-plane, starting with the most significant bit plane, the device comprising:

a restoring unit configured for receiving from said bitstream a parameter ($S_{MAX}$) of a corresponding bit plane, determined, in accordance with a predetermined parameter definition, in such a way that, for each bit plane, said parameter $S_{MAX}$ defines a one-dimensional partition of significant and insignificant bits in the given bit plane, the defined one-dimensional partition enclosing all set bits of the corresponding given bit plane, wherein the one-dimensional partition of significant and insignificant bits follows a predetermined shaped path over the corresponding bit plane, the predetermined shaped path including all positions in a bit order sequence from a lowest order number position to a highest order number position of the corresponding bit plane, wherein the parameter $S_{MAX}$ comprises an order number corresponding to a highest bit order number set bit in the bit order sequence of the one-dimensional partition, wherein a set bit is meant as one selected from the group consisting of a one and a zero, the restoring unit further configured for receiving all magnitude bits, which includes all set bits and which can also include non-set bits, whether significant bits or insignificant bits, enclosed within said partition of bits defined by said parameter ($S_{MAX}$) of the corresponding given bit plane, and the restoring unit further configured, in connection with a bit plane buffer and a partition memory, for reconstructing said values on the basis of said parameter and said received magnitude bits.

\* \* \* \* \*